United States Patent [19]

Roberts et al.

[11] Patent Number: 4,845,504

[45] Date of Patent: Jul. 4, 1989

[54] MOBILE RADIO NETWORK FOR NATIONWIDE COMMUNICATIONS

[75] Inventors: Carlos V. Roberts, Falls Church, Va.; Chong K. Ong, Derwood; John G. Puente, Rockville, both of Md.

[73] Assignee: M/A-COM, Inc., Burlington, Mass.

[21] Appl. No.: 35,791

[22] Filed: Apr. 8, 1987

[51] Int. Cl.$^4$ ............................................. G01S 3/02
[52] U.S. Cl. .................................... 342/457; 455/54
[58] Field of Search ................. 342/457, 460; 455/52, 455/54

[56] References Cited

U.S. PATENT DOCUMENTS

| | | | |
|---|---|---|---|
| 3,714,650 | 1/1973 | Fuller et al. | 342/457 |
| 4,112,421 | 9/1978 | Freeny, Jr. | 342/457 |
| 4,144,496 | 3/1979 | Cunningham et al. | 455/54 |
| 4,685,149 | 8/1987 | Smith et al. | 455/56 |

OTHER PUBLICATIONS

Final Report, "Analysis of Meteor Burst Communications for Navy Strategic Applications" MCC Document No. 797, Feb. 4, 1980.
"Diversity Reception for Meteoric Communications" by Ladd, IRE Transactions on Communications Systems, Jun. 1961.
"Polarization Rotation in Meteor Burst Communication Systems", *Radio Science,* vol. 21, No. 3, May-Jun. 1986.
"Performance of Meteor-Burst Communication Channels", *IEEE Journal on Selected Areas of Communication,* Feb. 1987.
"Networked Meteor-Burst Data Communication" by Kokjer et al, *IEEE* Nov. 1986, vol. 24, No. 11.
"Meteor Burst Communications: Bits Per Burst Performance Bounds" by Martin Abel, *IEEE* vol. Com. 34, No. 9, Sep. 1986.

*Primary Examiner*—Theodore M. Blum
*Attorney, Agent, or Firm*—Pollock, VandeSande & Priddy

[57] ABSTRACT

A mobil radio communication network utilizing meteor burst communication medium. A master station communicates with a plurality of mobile radio stations using digital messaging. Each of the master stations generates polling data sent over a plurality of sectors to identify mobile radio stations to which messages are to be transmitted. Messages for transmission are composed at the master station, and when an acknowledgement is received in one of a plurality of receive sectors at the master station from the polling command, the messages are subsequently transmitted. Transmission of a message following receipt of an acknowledgement occurs only over a transmit sector containing the received acknowledgement signal. Messages may be composed in each of the mobile radio stations and sent digitally to the master station which responds by sending an acknowledgement over the transmit sector which is coextensive with the receive sector having processed the acknowledgement signal.

18 Claims, 7 Drawing Sheets

| SYNC | MESSAGE NO | TYPE OF ADDRESS | ADDRESS 1 | 2 | 3 ...... N |

POLLING COMMAND

| SYNC | ADDRESS | TYPE | TEXT | EOM |

OUTBOUND MESSAGE

| SYNC | ADDRESS |

INBOUND ACKNOWLEDGEMENT

| SYNC | ADDRESS | TYPE | TEXT | EOM |

INBOUND MESSAGE

| SYNC | ACK - ADD | ADD - 1 | ADD-2... | ADD-N |

OUTBOUND ACKNOWLEDGEMENT

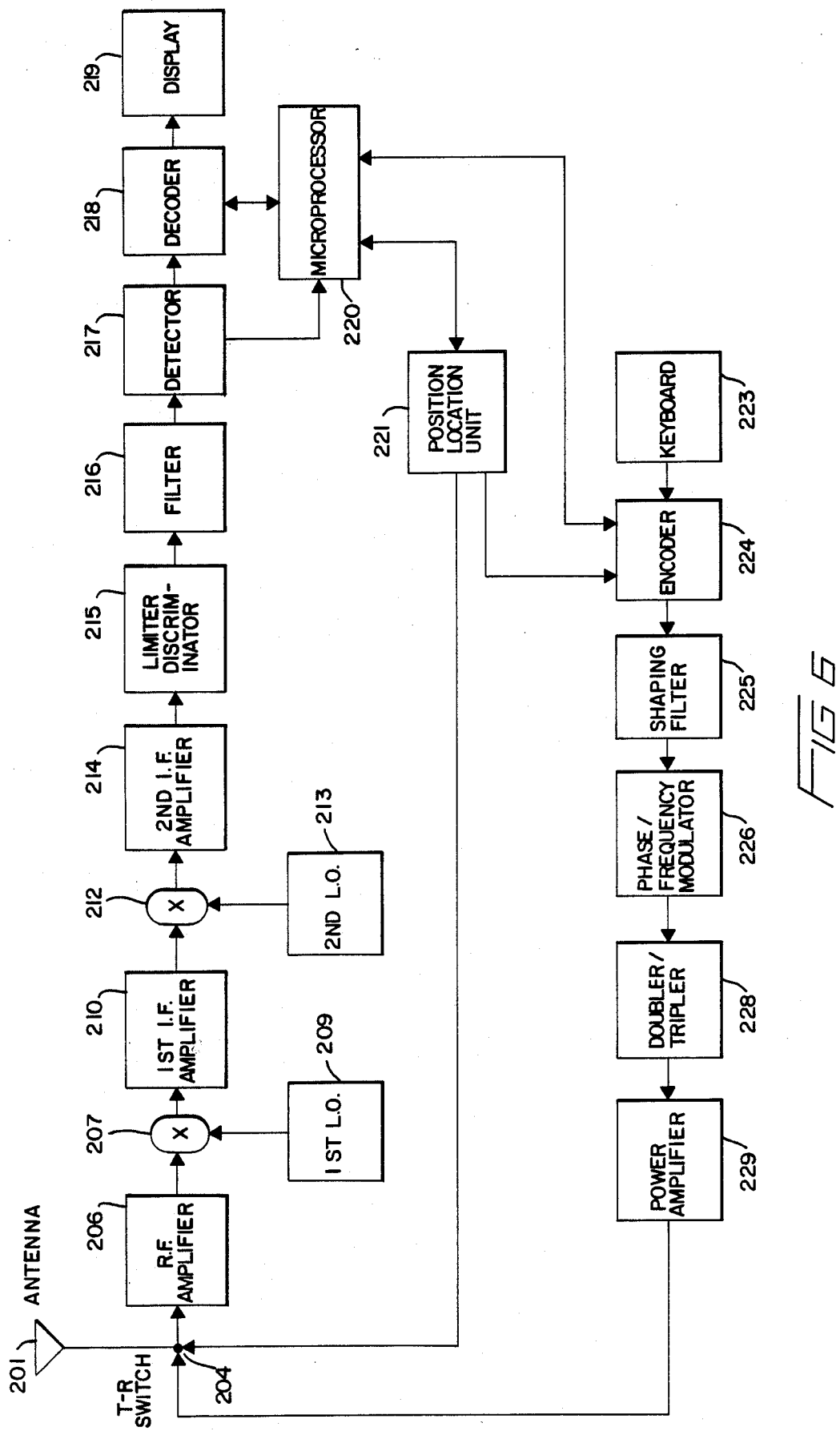

MOBILE RADIO NETWORK FOR NATIONWIDE COMMUNICATIONS

BACKGROUND OF THE INVENTION

The present invention relates to the mobile radio art. Specifically, a communication network is described for a mobile radio service utilizing meteor bursts as a communication medium.

Mobile radio networks are commonly found in public use. Generally, such systems cover small geographic areas utilizing VHF frequency communications. In order to extend the range of these geographically limited systems, complex interconnections between base stations are provided by microwave link, satellite link or other dedicated services.

It has been known in the past to utilize the reflective capabilities of meteor bursts for communicating from point to point. Meteor burst communication systems are based on the use of meteor trails which are generated when particles enter the earth's atmosphere and ionize a path over which the meteors travel. These trails are typically 50-75 miles above the earth's surface. Radio frequencies in the frequency range of 40-50 megahertz are reliably reflected from these ionized trails. As a result of the height of these trails, over the horizon communications at distances up to 1200 miles become practical.

High speed meteor burst digital communications have been realized between fixed points by various government agencies. One such system for collecting meteorological data is described in U.S. Pat. Nos. 4,277,845 and 4,630,314. The described digital communication system is used for sending meteorological data from remote locations to a central data collection point.

A major system limitation is imposed by the fact that, although billions of meteor trails are created every day, their duration in time is usually from a few milliseconds to a few seconds. This means that the viability of the reflective ionized trail lasts for a brief moment in which the data packet must be sent from a distant transmitter.

The present invention provides a nationwide communications network for a mobile radio service utilizing the propagating capabilities of meteor bursts. A specific protocol has been designed for the communications system, as well as a specialized transmit-receive base station facility to avoid the limitation imposed by the brief duration of the ionized meteor trail.

SUMMARY OF THE INVENTION

It is an object of this invention to provide a nationwide mobile radio data service.

It is a more specific object of this invention to provide a mobile digital radio service utilizing the reflective capabilities of meteor trails.

These and other objects are provided by at least one master station and a plurality of mobile radio stations which communicate over brief meteor bursts occurring in the upper atmosphere. Utilizing two master stations, an entire area the size of the continental United States may be covered, permitting mobile communication from anywhere in the United States to one of the two master stations.

Each of the master stations includes a unique transmit station which can transmit either a polling data message or an information message in any of a plurality of individual azimuth sectors permitting transmission in any direction from a master station. Messages for transmission to the various mobile radio units are composed at the master station. The messages are transmitted in a frequency range for reflection from a meteor trail. The transmit station includes a circular array of individual transmit sector antennas which provide 360° of azimuth coverage.

A receiving antenna array is provided at each master station which provides for 360° of azimuth coverage for detecting incoming signals. The receive array comprises a plurality of antennas generally spaced among the transmit antennas in the circular array providing a plurality of receive sectors which can be monitored for incoming messages. The combined receive sectors provide receive coverage coextensive with the transmit coverage of the combined transmit sectors.

A unique protocol is provided for transmitting and receiving messages between a mobile and master station. When a master station has a message to send, it will initiate a polling message in each of the transmit sectors, identifying by address one or more stations to which communication is desired.

Upon receipt of a recognizable polling address belonging to a mobile station, the mobile station will initiate an acknowledgement on a fixed frequency different from the master station transmit frequency. The master station, upon receipt of the acknowledgement, will immediately transmit the outbound message.

The master station receive and transmit antenna arrays are operated to note the sector from which an incoming message is being received, and to transmit on a sector which is known to contain the mobile station for which a message is destined.

Messages originated from a mobile unit are composed at the mobile unit. The mobile unit will listen to the frame of data being sent from the master station. When the mobile unit detects a master station transmission, the mobile unit responds with its message transmission. Collisions between simultaneous transmissions of two mobile stations are avoided with the selective antenna receive pattern at the master station. If two simultaneous mobile transmissions are received in the same receive sector, the master station will not acknowledge any message containing errors as a result of the collision between simultaneous transmissions.

If the master station hears the transmitted signal it will decode the message, and if validated as having been correctly received after appropriate error correction, an acknowledgement will be sent by the master station, acknowledging receipt of the message.

DESCRIPTION OF THE FIGURES

FIG. 6 is a block diagram of a transceiver for communicating with a base station.

DESCRIPTION OF THE PREFERRED EMBODIMENT

Figure 1:
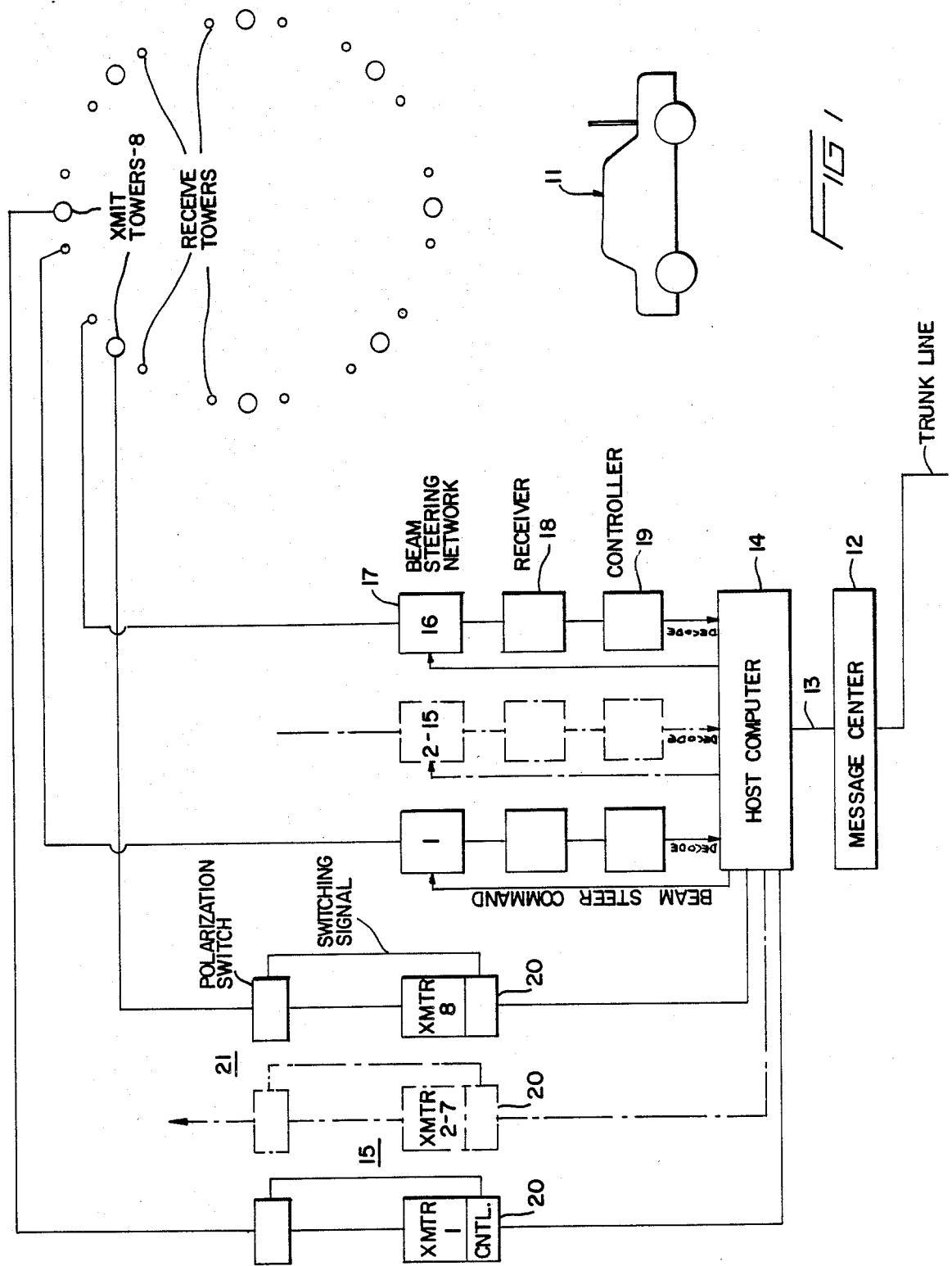
FIG. 1 is an overall block diagram of the master station in the network.

Referring to FIG. 1, there is shown the general layout of a master station for receiving and transmitting digital messages to a plurality of mobile stations 11. As the effective range for a master station is estimated to be 1200 miles, two of such stations can effectively handle all traffic in the continental United States. A central station 12 serving as a message center is connected by a telephone trunk or other local communication medium, for receiving digital messages to be transmitted through the master station, and for receiving and relaying those which are received by the master station to a subscriber. The central station message center 12 may include a modem for transmitting digital data packets between the trunk and personal computer at the message center 12, or other device which can transmit and receive digital messages from a host computer 14, and transmit the same over a standard link 13, such as an RS 232. The central station message center 12 may, of course, be a manually operated facility wherein a dispatcher receives messages to be composed and transmitted, as well as distributes digital message data received by the master station from a mobile station.

The master station includes an array of eight transmit towers 5 and sixteen receive antenna towers 6. The eight towers divide the effective transmit coverage area in eight sectors, each subtending an arc of approximately 45°. The eight antenna towers 5 each comprise two five-element cross polarized yagis stacked vertically at a height of 5 wavelengths, providing separate polarization senses in the horizontal, vertical or circular polarization senses. Depending on propagation conditions, the system will use the most advantageous polarization sense.

Sixteen receive towers 6 are located in approximately the same circumferential arc as each of the transmit antenna towers 5. The sixteen receive towers 6 each generate a steerable sector beam capable of covering a beam width of approximately $22\frac{1}{2}°$ indexable in three azimuth positions, and in three elevation positions. The steerable beams of the sixteen receive antennas 6 are controlled from the host computer 14 such as to provide a sector scan of nine different positions for each tower. The receive towers may provide both horizontal and vertical polarization signals.

With the aforesaid antenna structure, it is possible to transmit on one frequency in any one or all of eight different azimuth sectors and receive on a separate duplex frequency, different from the transmit signal in any one of the sixteen sectors or on all of the sixteen sectors as required.

Figures 2, 3:
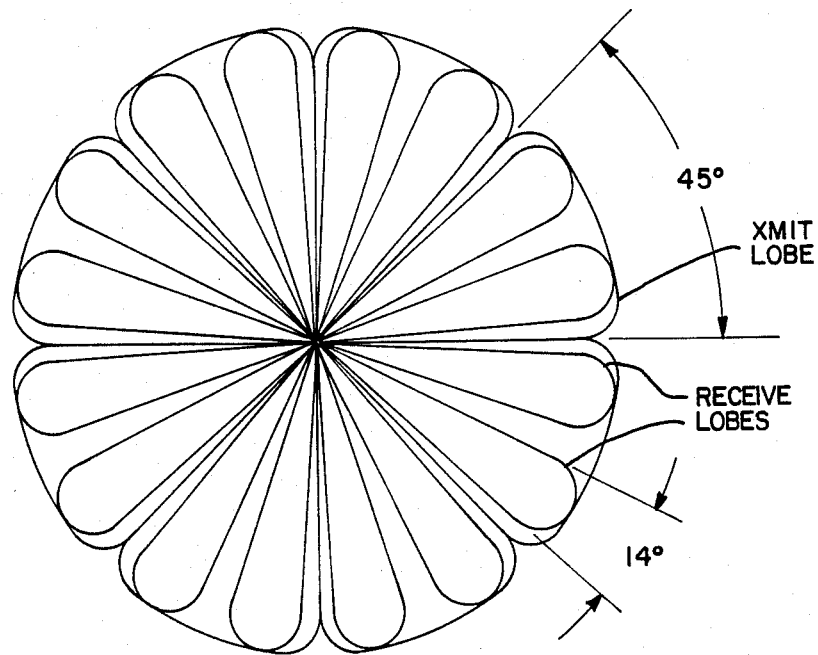
FIG. 2 is an illustration of the transmit and receive lobes generated at the master station.
FIG. 3 is an illustration of the various message protocols exchanged between the master and mobile stations.

The azimuth plane of the receive and transmit sectors is shown in FIG. 2. The transmit sectors are seen to comprise a transmit lobe having a beam width of 45°. Two receive sectors are shown contained in each transmit lobe. The receive sectors are defined as lobes which can be steered in azimuth either side of their axis, as well as positioned vertically in three different positions. The adjacent transmit sectors have transmit lobes which intersect at the 3db points. Adjacent transmit beams may overlap in a sector which comprises approximately 37° azimuth coverage. The 37° of overlap in the transmit sector coverage can result in adjacent sector interference for mobile stations which lie in a transmit path contained within the 37° transmit sector overlap. One solution for avoiding interference from adjacent sector overlap is to time multiplex, on an alternate basis, transmission from adjacent transmit tower sectors.

Thus, it is seen that a measure of directivity for increasing the transmit and receive gain for the master station is provided by the individual sector arrays for both the transmit and receive function.

Each of the sixteen receive antenna towers is connected to a beam steering network 17 for positioning the receive sector beams in three different azimuth positions and three different elevation positions. The nature of the receive towers, which permit the generation and steering of the receive beams will be described more particularly with FIG. 4.

Continuing with the description of FIG. 1, each of the beam steering networks 17 is connected for control by the host computer 14. Each of the receive beams are simultaneously stepped during an initial programming mode through each of the nine positions.

A receiver 18 is shown for each of the receive antenna towers. The receiver 18 will provide decoded digital data which is received in any of the sixteen receive sectors.

The controller 19 is shown in each of the sixteen tower receive stations which will send a control signal to the host computer, indicating a message is being received in a given receive sector. The host computer 14 will initiate an INHIBIT signal to the beam steering network 17 in response to the control signal. Following the successful decoding of a signal by the receiver 18, the individual controller units 19 will enable host computer 14 to continue steering the receive beams along a preprogrammed position format.

Shown associated with each of the transmit towers is a transmitter 15 and respective controller unit 20 for the transmit towers. The transmitters 1–8, operating at a frequency offset with respect to the frequency of receivers 18, and the frequency of the transmitter of the mobile units 11, will transmit message and polling data in one or more of each of the sectors defined by a transmit tower antenna array. Each transmitter 15 may have a peak power of 10 kW. The transmitter 15 produces duobinary FSK modulated data from data received from a respective controller 20.

Each controller 20 will decode a polarization command to switch polarization of each transmit tower. Host computer 14 will determine conditions which require a polarization change by tallying the number of receive acknowledgements for each initiated polling command. Polarization switch 21 will provide one of two signal outputs representing vertical or horizontal polarization feed lines connected to each transmit tower 5.

Each of the eight transmitters 15 receives data for transmitting from the host computer 14. In operation, the receive portion of the master station will identify a sector containing a given mobile unit 11 when the mobile unit 11 sends either an acknowledgement or message to the master station. Host computer 14 can then address any subsequent messaging to a given mobile unit through the appropriately identified transmit sector, avoiding utilizing channel bandwidth for other transmit sectors not needed for communicating with a given mobile unit 11.

Associated with each transmitter 15 is a controller 20 which receives the data from host computer 14 over an RS232 link. The controller 20 is an interface which may be a standard interface such as the MDI Model 4031. The host computer 14 downloads the components of the messages shown in FIG. 3. The controller formats the message components along with error correction bits to provide a duobinary FSK modulation signal for each respective frequency modulated transmitter 15 of a sector. Messages are encoded with standard FEC error correction techniques. Burst errors resulting from man-made interference or fading are efficiently corrected with the Reed Solomon code. The outbound data rate transmitted by each transmitter 15 may be 4800 bps, with a carrier frequency deviation of 4 kHz. The transmitter may have a carrier frequency of 47 mHz which is known to produce reliable meteor burst reflections.

Referring to FIG. 3, there is shown the various message types which are transmitted through the master station and received through the master station for communicating with a plurality of mobile radio stations 11.

The first message type shown in FIG. 3 is a polling command which is initiated any time the master station receives messages through the message center 12 for transmission to any one of a plurality of mobile radio stations 11. During those periods of time in which no messages are to be sent to the mobile stations, the polling command is continually transmitted with dummy addresses providing a signal for the mobile station to verify that the communication channel is open and available. The polling command could, upon initialization, be sent to all transmit sectors, as a given mobile radio station's location may be unknown. A polling command consists of a series of sync bits followed by a one bit message number distinguishing successive polls. The type of address which follows indicates whether it is an individual mobile unit 11, or a group of mobile units. A 1 bit in this location indicates group polling, a 0 is individual polling. The address sent in a group poll is the group identification.

The remaining digital bytes are the addresses of a particular mobile unit 11 which is to receive a message when an individual poll is being conducted. A message number bit is included which toggles between 1 and 0 to distinguish between successive polls.

The control station center 12 receives and compiles messages to be sent to an individual mobile radio station. These outbound messages are shown in FIG. 3 as comprising the requisite synchronization data, the address of an individual mobile unit to receive the following message, a message type, followed by the text and an end of message (EOM) character. The outbound message will be transmitted through a transmit sector after an acknowledgement is received by successfully polling the individual mobile radio station.

When the mobile radio station 11 hears its address on the receive frequency, it will initiate an inbound acknowledgement shown in FIG. 3. The inbound acknowledgement includes synchronization pulses as well as an address identifying the origin of the particular inbound acknowledgement. Thus, the polling command could be polling any number of mobile radio stations 11 in each frame of a cycle and individual acknowledgements will be received and identified by the address contained in the inbound acknowledgement.

The master station, having received an inbound acknowledgement, will then transmit the outbound message shown in FIG. 3. As the particular receive sector receiving an acknowledgment has been identified by the receiver 18 and controller 19 for the receive sector, the outbound message may be sent over a single corresponding transmit sector to avoid redundant broadcasts in transmit sectors which do not include a particular mobile radio station 11.

Messages may also be originated from a mobile radio station. The mobile radio station 11 will compose an inbound message and include therein, as shown in FIG. 3, the requisite synchronization bits, its address, the type of message, the message text, and an end of message character. The inbound message is sent any time that the mobile radio station 11 can hear the frame being transmitted from the master station. In the event two or more simultaneous mobile station transmissions suffer a collision at the master station, and generate message errors in excess of a tolerable level, the master station will not acknowledge the mobile radio station transmissions, requiring the mobile radio stations to retransmit the messages. Each mobile radio station using standard collision avoidance protocol techniques, waits a random time and attempts a subsequent retransmission of the message when the master station carrier is heard. To distinguish a collision from other circumstances which do not permit the master stations to decode and acknowledge the message, at least two attempts of transmitting the mobile radio station message is made before entering a random retransmit collision avoidance mode.

Each master station receiving an inbound message will stop beam scanning within the sector receiving the inbound message and process the inbound message through a respective receiver 18 and controller 19. The stationary receive beam will process the incoming inbound message.

Following receipt and decoding of the inbound message, the host computer 14 will forward the decoded message with its appended address as shown in FIG. 3 to the central message center 12. The message center may, in a more simplified system, print out the message with its address for forwarding by a human operator over a trunk line or other means to a destination indicated in the inbound message.

Upon successful decoding of the inbound message, an outbound acknowledgement is sent to the transmitter 11 as part of the transmit frame for the transmit station, identifying all of the mobile radio stations for which a message has been correctly received.

Having generally described the operation of the master and mobile radio stations, a more detailed description of the transmit and receive array will be made.

Figure 4:
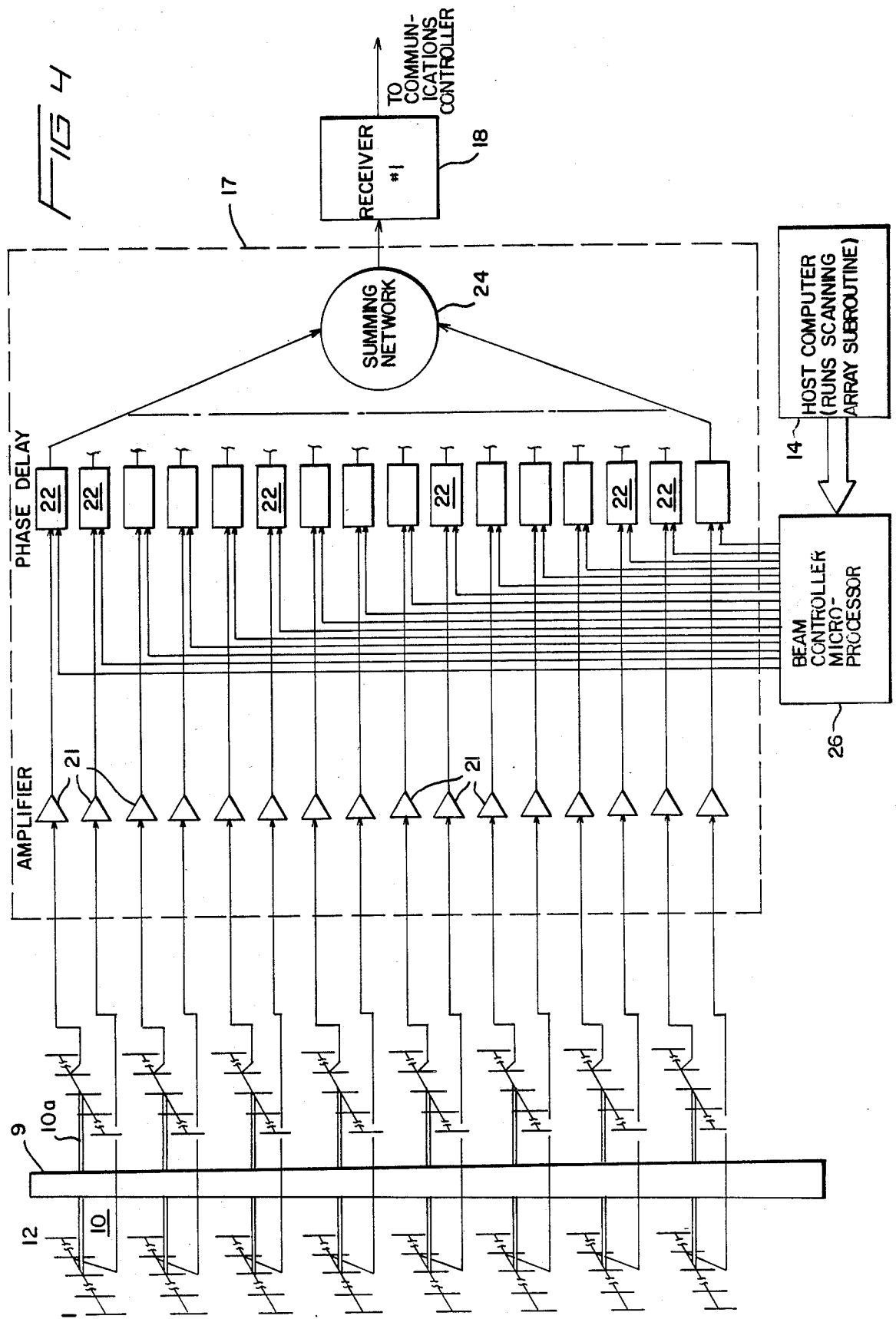
FIG. 4 illustrates the beam scanning technique for scanning each sector received beam in azimuth and elevation.

Referring in particular to FIG. 4, there is shown one of the receiving towers of FIG. 1 and its associated beam steering circuitry. Each of the receive towers 9 includes a stacked array of eight pairs of 12-element yagi antennas 10. Each antenna of a pair 10 is disposed along a horizontal axis. Each antenna of each pair of antennas 10 are shown connected to an individual amplifier 21 which in turn is connected to a respective variable phase delay network 22. By changing the phase between horizontally adjacent yagi antennas, it is possible to steer the sector beam formed by the array of antenna pairs three positions in azimuth for the sector beam formed from the tower. The receive beamwidth of the array formed by each of the receive towers is approximately 14° in azimuth and 7° elevation, steerable in azimuth for a total effective beamwidth of 21°. In elevation, the beam is steerable to cover an elevation angle of $+3\frac{1}{2}°$ to $24\frac{1}{2}°$.

Steering in azimuth is accomplished by selecting a phase delay between adjacent horizontal yagi arrays 10 which is proportional to the angle $\phi$ identifying the beam position with respect to the horizontal axis 10a as follows $$\phi_A = 2\cos\phi \cdot 360°$$

where $\phi_A$ is the phase between adjacent antennas of each pair.

To steer the receive lobes in elevation, the phase delays 22 between vertically adjacent antennas 10 are selected as follows $$\phi_n = \left[8 - \frac{(n+1)}{2}\right]\sin\theta \cdot 360 \qquad n = 1, 3, 5 \ldots 15$$

where each one of the eight pairs of antennas takes on an odd value of n, $\theta$ being the off axis angle with respect to the horizon, and $\phi_n$ is the phase between vertically adjacent antennas.

Depicted in FIG. 4 is a scheme for a single polarization wherein each antenna of the pair 10 will be vertically polarized. It is possible, of course, to add a second polarization sense, wherein the summing networks 24, phase delays 22 and amplifiers 21 are repeated for the other sense of polarization. A digital voting circuit known to the communication industry is interposed between the receiver and associated controller of each polarization sense. The voting circuit will forward non-duplicative valid messages from controllers to the host computer. However, for purposes of description the single vertical polarization yagi elements are shown.

A beam controller microprocessor 26 is shown for stepping the phase delays 22 in a sequence which will move the radiation beam formed from the tower 1 in azimuth three positions, as well as in elevation three positions. The scanning of the radiation beam can be inhibited by the host computer 14 when a signal has been detected in receiver 18, such as to permit the beam to remain positioned while the signal is being decoded. The software description for the host computer 14 to permit control over the beam scanning will be described at a later time.

Each of the transmitter towers comprises an array similar to that of each receive tower 9, but without the ability to steer the beam. Each transmitter tower comprises a vertical stacking of two vertically and horizontally polarized five-element Yagi-Uda arrays with dual polarization selection capability. One or the other will be selected by feeding energy to one or the other of two sets of elements on each antenna. The pattern resulting from such a stacked array has an azimuth beam width of approximately 48° which is substantially the desired sector of 45° for each transmit tower as shown in FIG. 2.

Each receiver 18 of the master station may be the receiver of a commercially available mobile radio station used in voice communications. Filtering stages of such a conventional receiver which are intended to filter demodulated voice are removed to enhance the ability to recover duobinary FSK data signals.

The controller 19 for each receiver may also be a commercially available interface which receives demodulated duobinary FSK data. The controller 19 has built in error correction circuitry for error correcting the FEC encoded digital data.

Figure 5A:
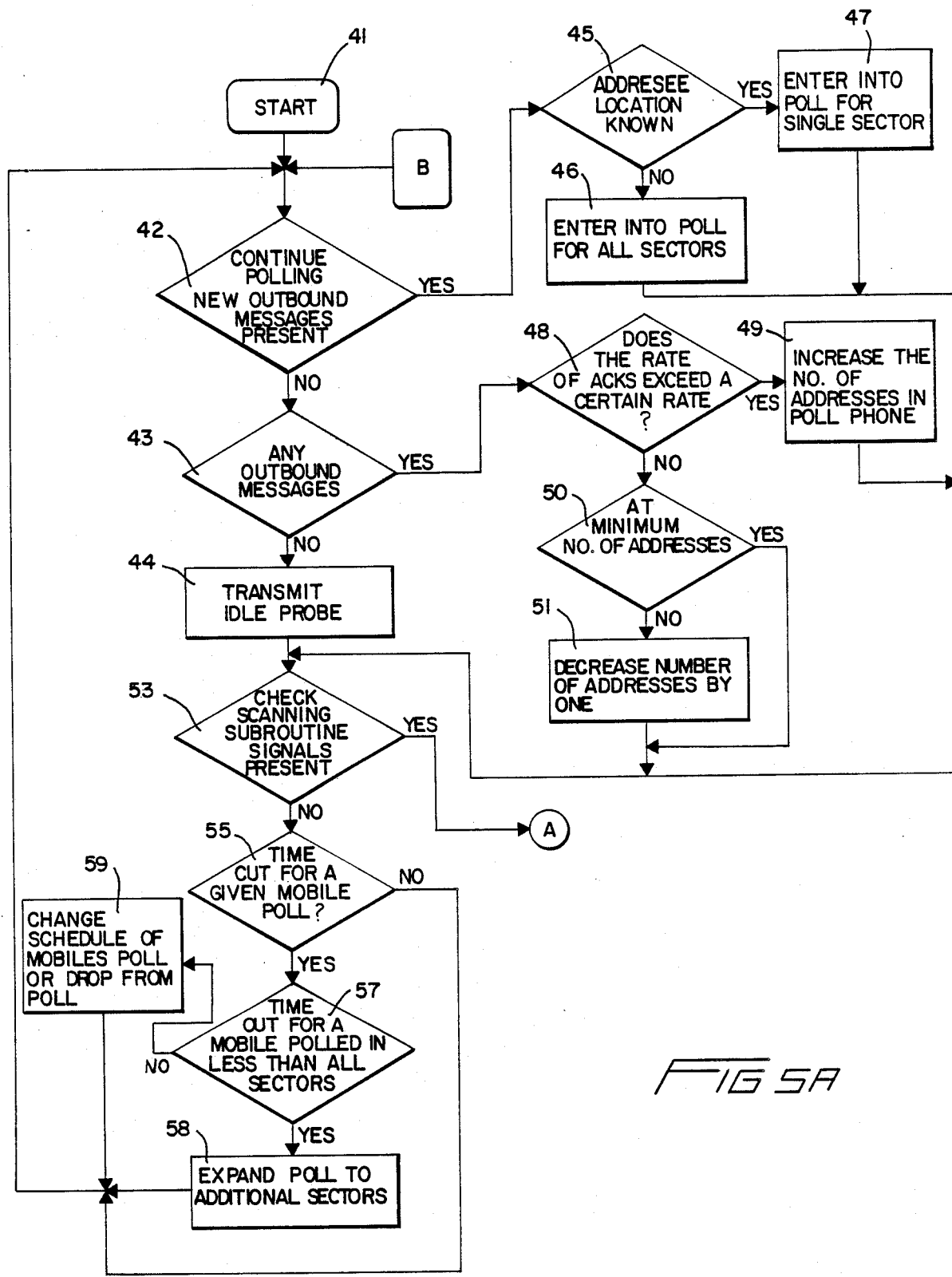
FIGS. 5A and 5B are flow charts illustrating the operation of the system under control of the host computer for each of the transmit and receive sectors.
Figure 5B:
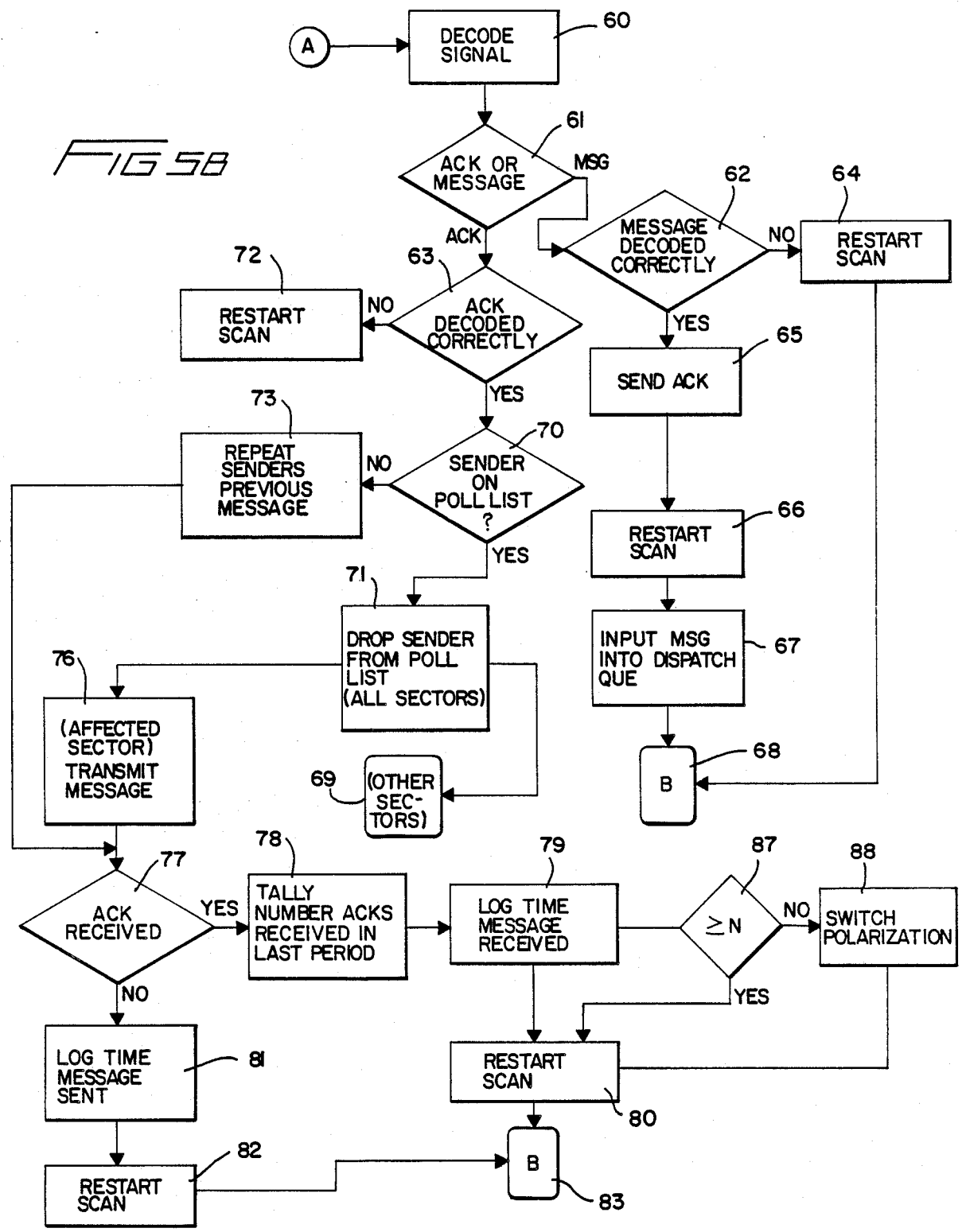

Having thus generally described the receive and transmit functions, the program necessary to carry out the transmission and reception protocol for the master station is shown more particularly in FIG. 5A and 5B. FIGS. 5A and 5B show a flow chart of the programming operation executed by computer 14 for each of the eight transmit sector and sixteen receive sectors.

Each of the operations in the transmit and receive sectors can be considered to begin at start 41. A decision block 42 will determine whether or not there are any new outbound messages which are to be sent to a given mobile station 11. If the host computer 14 has received from the central station message center 12 a new message to be sent, the host computer 14 will determine whether or not the location of that mobile 11 station has been previously determined. If so, the mobile station 11 which is to receive a message will be polled in a single sector in step 47. Thus, one of the transmitters 1 through 8 of FIG. 1 which is dedicated to broadcasting in the identified sector, will receive a polling message such as is shown in FIG. 3, including the address of the new message addressee. If the location of the addressee is not known, the poll command will be entered in all sectors in step 46, such that each of transmitters 1 through 8 broadcasts a polling command shown in FIG. 3.

Assuming there are outbound messages which must be sent as determined in step 43, an algorithm is entered through step 48 to either increase or decrease the number of addresses contained in a given polling command. In the event that acknowledgements received after a poll command exceed a certain rate, the rate of polling addresses can be decreased in step 51. This will depend on whether a minimum number of addresses have been successfully polled as determined in decision block 50. Also, in the event that the number of acknowledgements received exceeds a certain rate, the number of addresses in a given poll ar increased in step 49.

In the event no messages are in the message queue of central station message center 12, each of the transmitters 1 through 8 will enter into an idle probe mode in step 44. This will maintain a carrier on the transmit sectors to permit the mobile unit 11 to sense the carrier. This carrier sense is necessary in order to determine whether mobile stations should attempt access to the master station receive channel.

In the event that a given mobile unit 11 poll has not been acknowledged within a certain time-out period, decision block 55 will either change the schedule for polling the mobile unit or drop the poll from the polling frame. In the event that polling has been limited to less than all the sectors, decision block 57 will expand the poll to include all sectors in step 58, until an acknowledgement is received. If the mobile station is already being polled in all sectors, step 59 will reduce the rate of polling for the particular mobile station or alternatively drop the mobile station from the polling schedule.

Each of the controllers of the receivers of the master station is locally polled by the host computer in step 53 to determine whether there is a message present in any of the receive sectors. A detected message will result in the receive sector scanning being inhibited. When a signal is detected to be present, it is decoded in step 60 of FIG. 5B. Decision block 61 will determine whether the decoded signal is either an acknowledge from a previous poll or is a message originated from a mobile unit 11. If the message was received from mobile unit 11, the message is decoded, the error corrected in step 60 and validated in decision block 62. In the event that the message has not been validated, indicating the message was decoded incorrectly, the scan for the receive sector is restarted in step 64.

In the event a message is correctly decoded, an acknowledgement is sent in step 65 to the mobile unit. Following the acknowledgement, the scan for the receive sector in which the signal was received is restarted in step 66. A dispatch queue in the central station message center 12 receives the decoded message in step 67 which permits it to be either transmitted via modem to a leased private line or manually conveyed by an operator to its destination.

When an acknowledge is detected as being sent from one of the mobile radio stations, step 63 will determine whether or not it has been decoded correctly. If it has not been correctly decoded, the scan of the receive sector is restarted in step 72. In the event it has, the decoded acknowledge will include an address of the originating mobile unit which has transmitted the acknowledge. Step 70 will determine whether or not the acknowledge is from one of the stations being polled. If it is, that station is dropped from the poll command in step 71. If not, the step 73 repeats the polling message command in search of an acknowledgement from a mobile unit 11 to which the master station wishes to send a message.

When the acknowledge has been received from a mobile unit 11, the sector which has received the acknowledgement is noted in step 76, and a message is transmitted in a corresponding transmit sector which includes the receive sector producing the acknowledgement.

After the message has been sent, and if the mobile unit has not responded with an acknowledgement, as determined in step 77, indicating that it has not received the message it expects to receive, the time that the message was sent is logged in step 81, and a rescan of the receive sectors is started at 82, and the program returns to central point B of FIG. 5A.

In the event an acknowledgement of the transmitted message has been received from a respective mobile station 11, a tallying step 78 registers a number of acknowledgements received for a given period, as well as the time logged for the delivery time of the message in step 79. The tallying step will provide the system operator with up to date propagation conditions. The tally step may be used to initiate a transmit polarization change when the rate of received acknowledgements per transmitted polling messages falls below a predetermined threshold. An additional decision step 87 will compare the rate of acknowledgement received with a threshold value n. When the rate of acknowledgements is below n, the host computer 14 will effect a change in polarization for each of the transmit sectors in step 88. The receive array sector scan is restarted in step 83, and the new polarization is effected for transmitting when control returns to B of FIG. 5A.

Thus, the overall functioning of the master station of FIG. 1 has been explained in terms of the flow chart of FIG. 5.

The mobile unit 11 includes a standard mobile data terminal which composes messages, and inserts them in a message queue for transmission.

Figure 7:
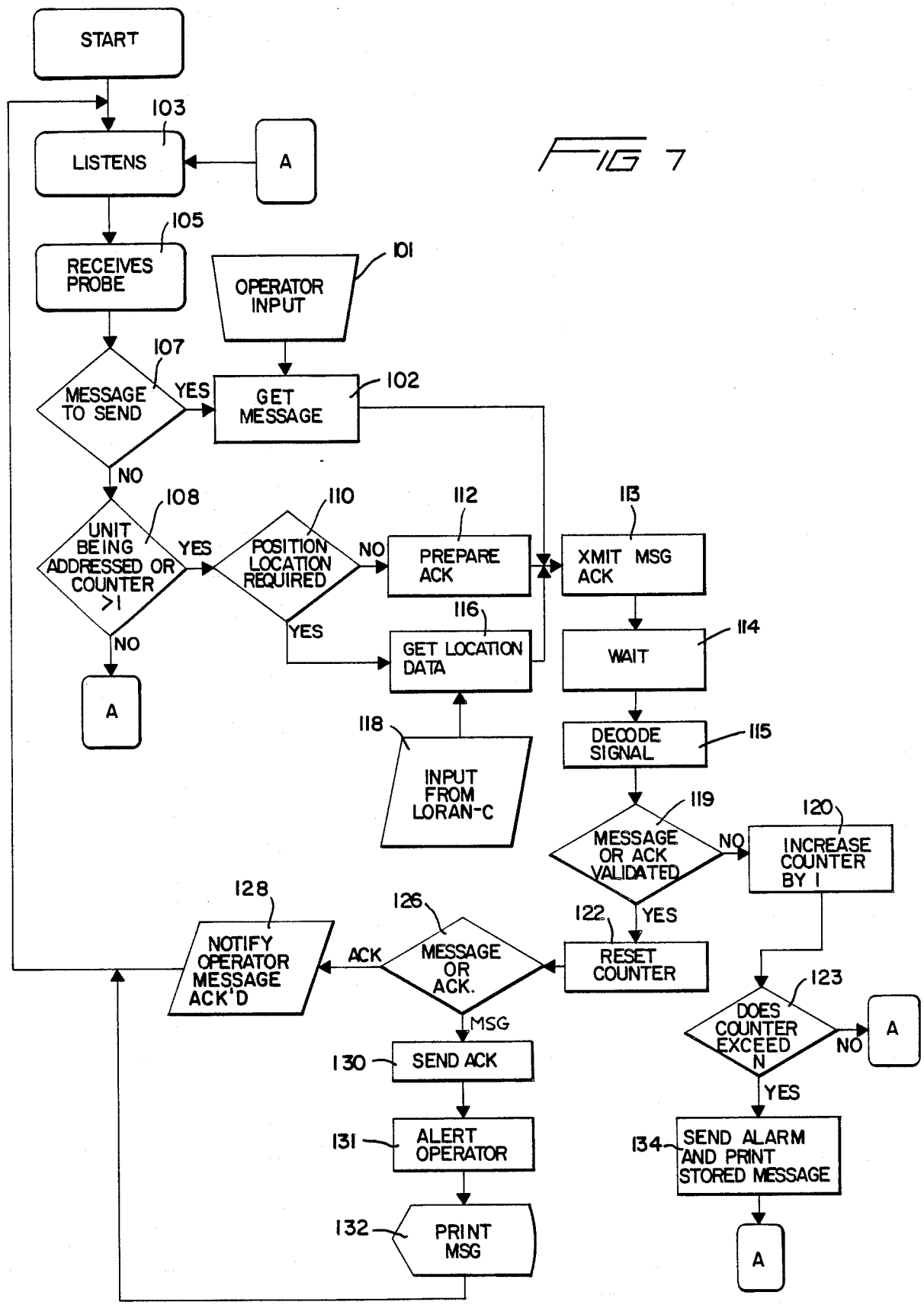
FIG. 7 is a flow chart of the microprocessor controlled radio unit for receiving and transmitting messages.

The mobile units 11 have a common protocol which is described in detail in FIG. 7. The mobile units are a standard duplex transmit receive unit which receives digitally composed data as well as displays digitally received data. The transmit frequency for the mobile unit 11 is, of course, selected to be the same as the receive frequency for the master station. The receive frequency of the mobile unit 11 is selected to be the same as the transmit frequency for the master station.

Referring now to FIG. 6, there is shown a block diagram of one embodiment of a mobile transceiver which may be used in the meteor burst communication system of the present invention. The receiver includes a double conversion superheterodyne receiver, typical of many mobile communications transceivers. The antenna 201, shown as a whip antenna in the general system description of FIG. 1, is connected to a transmit-receive (t-r) switch 204. Also connected to the t-r switch 204 is the receive RF amplifier 206, the power amplifier 229 for the transmit portion of the transceiver, and a position location unit 221. The position location unit 221 provides position data over a standard interface such as an RS-232 to the encoder 224 for formatting as a message to be transmitted. The position location unit 221 may be a Loran-C position location system which receives on antenna 201 until a message is to be transmitted. The t-r switch 204 may be an isolator or an electromechanically controlled switch operated from the microprocessor in order to isolate transmit power from entering either the position location unit 221 or RF amplifier 206. The position location unit 221 can, under control of microprocessor 220, output a recent position determination to encoder 224. The encoder 224 will, under control of the microprocessor 220, format a position location message for transmission to the master station. The transmission may occur from either a poll received from the master station requesting the position of the mobile unit, or transmitted on a periodic basis as determined by the system operator.

RF amplifier 206 is tuned to the receive frequency of 49 megahertz. A first local oscillator 209 and mixer 207 provide the first conversion. The first intermediate frequency signal is amplified in IF amplifier 210. A second local oscillator 213 and associated mixer 212 generate a second intermediate frequency signal, amplified by second IF amplifier 214.

Limiter discriminator 215 demodulates the frequency modulated carrier bearing the messages from the master station. The discriminator 215 is selected to demodulate FM signals having a frequency deviation of 4.0 KHz. The demodulated duobinary FSK signals appear as a polarity change signal alternating between polarities.

A threshold detector 217 checks the polarity of the pulses from the discriminator and provides an indication of a binary 1 or 0 level. A filter 216 is included, having a Butterworth frequency response with a bandwidth slightly greater than the bit rate of the data being demodulated.

A decoder 218 provides for the error correction and decoding of the received signal in cooperation with microprocessor 220. Decoder 218 will store detected messages and microprocessor 220 will effect the error correction therein. An alphanumeric display 219 will be provided to display each decoded message The transmitter portion of the transceiver of FIG. 6 includes a standard keyboard 223 and the encoder 224. The encoder 224, in cooperation with microprocessor 220, will format messages to be sent to include parity and error correction bits. A filter 225 prefilters the signals. The premodulation filter will provide a signal to the phase modulator 226 providing for duobinary FSK baseband modulated data signals. The resulting modulated baseband signal is frequency multiplied in doubler/tripler 228 to the required transmit frequency of 49 megahertz. Power amplifier 229 will provide the necessary gain to a level of approximately 100 watts for coupling to a whip antenna 201.

The operation of the transceiver of FIG. 6 is, as was stated, under control of the microprocessor 220. The programming for the microprocessor 220 which will result in the messages being correctly decoded and encoded for transmission will be described with respect to FIG. 7. The operation of the mobile unit in terms of the programming of microprocessor 220 will now be explained with regard to FIG. 7.

An operator input 101 is provided via a keyboard which will permit the composing of a message and storage of the message in a message queue.

The receiver continuously listens in step 103 to the master station transmit channel. Signals on the receive channel are decoded in step 105.

If no message has been composed by the operator to send, decision block 107 will transfer control to decision block 108 which determines whether or not a poll command is being received.

The mobile units may advantageously include a position location system such as a Loran C or other well known navigation device. If such information is available, it is stored for use by the system. In the event that the master station, in a poll addressed to the mobile unit 11, desires the position location for the mobile unit 11, decision block 110 will detect this request. The location data stored from the Loran C navigation equipment is retrieved in step 116 from the Loran C equipment 118 and sent through the mobile unit transmitter in step 113.

In the event a poll of the mobile unit is detected and position location information is not needed, an acknowledgement is prepared in step 112 and sent via the mobile unit transmitter in step 113.

Having thus sent a message or an acknowledge to the master station, a wait loop is entered in step 114. While waiting, the receiver listens for a message or an acknowledgement from the master station in step 115. The message is decoded and error corrected using standard FEC techniques in step 115. In step 119, the validity of the corrected message is determined. In the event no message or acknowledgement is received when expected, a counter is increased by one in step 120. This counter will keep track of the number of times the system has attempted to communicate with the master station without receiving a properly validated response. In the event that successive tries of sending a message in which no acknowledgement is received, or waiting for a message which was supposed to arrive but has not been received, exceeds N as determined in decision block 123, an alarm is printed on the display of the mobile unit terminal in step 134.

When an anticipated message or acknowledgement has been received, the counter is reset in step 122. If the received data communication was a message, an acknowledgement is sent in step 130. The operator is alerted in step 131 that a message has been received and is being displayed in step 132.

If the received digital communication was an acknowledgement, the operator of the mobile unit is notified in step 128 that an acknowledgement for a previously sent message has been received.

Thus, FIG. 7 is a detailed flow chart for demonstrating the implementation of the protocol described in FIG. 3. Protocol represented by the steps of FIG. 7 will interface with the master station software of FIGS. 5A and 5B such as to avoid the consequences of the transient nature of the meteor burst trails, insuring against an unnecessary loss of message content being transferred between mobile and master station units.

The system is capable of providing mobile communications over a maximum range of 1200 miles. The system described utilizes a meteor burst communication medium having a unique protocol which avoids the unnecessary loss of message content. Two of such matter stations are necessary in order to effect nationwide coverage of the contiguous 48 states.

The foregoing system of communicating via meteor trails between a master station and a plurality of remote mobile stations may also be used to determine the position of a mobile unit communicating with the master station. One technique which may be employed with the foregoing system is for each master station to initiate a message to a mobile station along with a tone burst. The mobile unit being interrogated repeats the tone burst. Allowing for equipment delay, a phase match between a locally generated tone of the same frequency and the receive tone at the master station determines the propagation time. The length of the propagation path between mobile and master station may be computed based on the propagation time. A plurality of measurements may be taken and the shortest distance represented by each of these measurements may be used as being most reliable.

The shortest propagation path length serves to identify a corresponding distance along the earth's surface between the master station and mobile unit by assuming a height for the meteor burst. This measurement of distance along the earth's surface is made for three different master stations for the same mobile unit. Three circles can then be drawn centered at a respective master station having a radius equal to the measured distance to the mobile unit. The common intersection of the circles identifies the mobile unit location.

It is also possible to determine the location of a mobile unit by measuring the azimuth of an incoming signal with standard direction finding equipment. The propagation time for messages being transferred between master station and mobile station is also computed as in the previous technique. A vector may be constructed centered at the master station using the azimuth, estimated height and propagation time for locating the position of the mobile radio station with respect to the master station. The propagation time is measured a plurality of times to derive the shortest propagation path length. A distance to the mobile unit is derived from the propagation path length and estimated height of the meteor trail. The distance and azimuth measurements constitute a vector identifying the mobile unit location with respect to the master station.

An alternate procedure which involves the use of three (3) master stations may also be implemented for determining the unique position of a mobile unit with respect to the three master stations. The azimuth and elevation of each incoming signal to each master station from the mobile unit in question is measured. Also, propagation time of signals originating from the mobile unit to each of the master stations is determined as in the previous methods. Assuming a height above the earth's surface for the meteor trail point of reflection, a unique vector is determined for each of the master stations pointing to the unique point of reflection for a given master station, as well as the distance from the point of reflection to the mobile unit. Therefore, three circles may be determined with the center given by the projection of the three reflection points to the earth's surface. The intersection of the three circles, one for each master station receiving the mobile unit communication, gives the position location for the mobile unit.

A still further procedure for position locating a mobile station requires the use of three positionally distinct meteor bursts. The mobile radio station will initiate three consecutive transmissions following three consecutive master carrier senses. The transmissions are separated in time sufficient to insure that a different meteor trail is used for each transmission. By noting the azimuth and elevation of the incoming transmissions to the master station using standard direction finding equipment, the direction of the meteor trail, via which the transmission is received, is known. Using the knowledge of the meteor trail height above the earth's surface, and the incoming signal angle of elevation and azimuth permits the distance of the meteor burst from the master station to be determined. A circle may be drawn centered at each of the three meteor trails. The radius of the circle represents the distance from the meteor trail to the mobile radio station. This distance may be computed by subtracting from the distance represented by the one way propagation time between the mobile radio station and master station via the meteor trail, the distance between the master station and meteor trail. The three circles thus constructed for three meteor trails will have a unique intersection representing the location of the vehicle with respect to the master station.

The foregoing are only exemplary of various techniques which may be implemented to identify the position of a given mobile unit with respect to any master station.

Thus, there has been described a mobile radio service using meteor trail communications. Those skilled in the art will recognize yet other embodiments described more particularly by the claims which follow.

What is claimed is:

1. A meteor burst communication system for communicating with a plurality of mobile radio stations from a single location comprising:
    a master transmit station for composing digital data messages, said master transmit station including a plurality of transmitters at one location for transmitting said digital data messages in a plurality of azimuth transmit sectors;
    a master receive station located at said transmit station site, said receive station having a plurality of azimuth receive sectors coextensive with said transmit sectors; and
    a host computer for initiating transmission of digital polling signals from said transmit station in said plurality of transmit sectors until an acknowledge signal is received from a polled mobile radio station in one of said receive sectors and identifying said receive sector, and said master station transmitting a subsequent digital message in lieu of said polling signal in one of said transmit sectors which includes said one receive sector, without transmitting said subsequent message in all said transmit sectors.

2. The communication system of claim 1 further comprising means for scanning each receive sector in elevation.

3. The communication system of claim 2 wherein said receive sectors scanning means is inhibited when a signal is being received in said sector.

4. The communication system of claim 2 wherein said means for scanning scans each receive sector in azimuth.

5. The meteor burst communication system of claim 1 further comprising means for inhibiting steering of said beam when a signal from a mobile unit is detected in a receive sector containing said beam.

6. A meteor burst master radio station for communicating with a plurality of mobile radio station units comprising:
    a master radio station having a plurality of azimuth transmit sectors at one master radio station site for transmitting digital messages to said mobile radio units and receiving digital messages in a plurality of azimuth receive sectors, said station originating in all of said transmit sectors a polling command identifying each mobile radio unit for which a message is to be transmitted;
    a plurality of receive sectors greater in number than said transmit sectors at aid one master radio station site for receiving incoming messages from said mobile radio units, said receive sectors processing and decoding each received message;
    a master station controller connected to route outbound messages to one or more of said azimuth transmit sectors, and connected to each of said receive sectors for receiving incoming messages identifying which of said receive sectors contains each incoming message, said master station controller including a host computer programmed to poll each of said mobile radio units in a plurality of transmit sectors for which a digital message is destined to detect the presence of an acknowledge signal sent by said mobile radio units, and to send each digital outbound message to said acknowledging mobile radio station in only one of said transmit sectors which contains an identified receive sector.

7. The meteor burst master radio station of claim 6 wherein said master radio station and mobile radio station transmit on different frequencies.

8. The meteor burst communication system of claim 7 wherein said master station transmits an acknowledge signal to each mobile radio station which transmits a message.

9. The meteor burst communication system of claim 6 wherein said host computer tallies each received acknowledge signal, and initiates a change in polarization for said transmit sectors when the rate of received acknowledge signals per transmitted polling message falls below a predetermined rate.

10. The meteor burst communication system of claim 1 wherein said azimuth transmit sectors are time multiplexed on an alternate basis to avoid co-sector interference.

11. A meteor burst communication system for communicating with a plurality of mobile radio stations comprising:
    a master transmit station for composing digital data messages, said master station including a transmitting antenna array forming a plurality of transmit sectors comprising individual azimuth sectors which form a composite transmit pattern;
    a plurality of transmitters connected to said transmitting antenna array, each forming with said array a separate transmit sector, and having an input for receiving a digital message for transmission over said sector;

a master receive station located at said transmit station, said receive station including a receiving antenna array forming a plurality of receive sectors greater in number than said transmit sectors, forming a composite receive pattern coextensive with said composite transmit pattern;

a plurality of receivers connected to said receiving antenna array for receiving radio frequency signals in an individual receive sector, and demodulating data contained in said radio frequency signals; and, a host computer connected to supply digital messages for transmission to said mobile radio stations and receive digital messages from said receivers, said host computer transmitting messages to said mobile radio stations over a transmit sector containing a mobile station identified to receive a particular message, and transmitting over the transmit sectors containing other mobile radio stations' messages destined for said other stations.

12. The meteor burst communication system of claim 11 wherein said host computer initiates polling commands over all of said transmit sectors to determine the location of mobile units which are to receive a digital message, and identifies an individual receive sector which produces an acknowledging signal from a polled mobile unit.

13. The meteor burst communication system of claim 12, wherein a transmit sector containing said identified individual receive sector, is identified by said computer, and said digital message is sent to a transmitter which uses said identified transmit sector.

14. The meteor burst communication system of claim 12, wherein each of said receive sectors includes a receive beam which is steerable within a receive sector.

15. The meteor burst communicating system of claim 15 wherein said receive beam is steerable in both azimuth and elevation.

16. The meteor burst communication system of claim 13, wherein said host computer initiates a subsequent polling command in transmit sectors which were previously in communication with a mobile radio station being polled.

17. The meteor burst communication system of claim 14 wherein said receive beam is steerable in elevation.

18. The meteor burst communication system of claim 12 wherein said mobile stations each include a position location unit for periodically reporting to said master station a geographical position for said mobile unit.

* * * * *

UNITED STATES PATENT AND TRADEMARK OFFICE
CERTIFICATE OF CORRECTION

PATENT NO. : 4,845,504

DATED : July 4, 1989

INVENTOR(S) : Roberts et al

It is certified that error appears in the above-identified patent and that said Letters Patent is hereby corrected as shown below:

In column 16, claim 15, line 2, delete "15" and insert therefor --14--.

Signed and Sealed this

Eighteenth Day of February, 1992

Attest:

HARRY F. MANBECK, JR.

*Attesting Officer*  *Commissioner of Patents and Trademarks*